3,232,865
METHOD OF PURIFYING WASTE WATER
Robert G. Quinn, Bound Brook, and Anthony E. Franzoso, Manville, N.J., assignors to Johns-Manville Corporation, New York, N.Y., a corporation of New York
Filed June 11, 1962, Ser. No. 201,602
1 Claim. (Cl. 210—11)

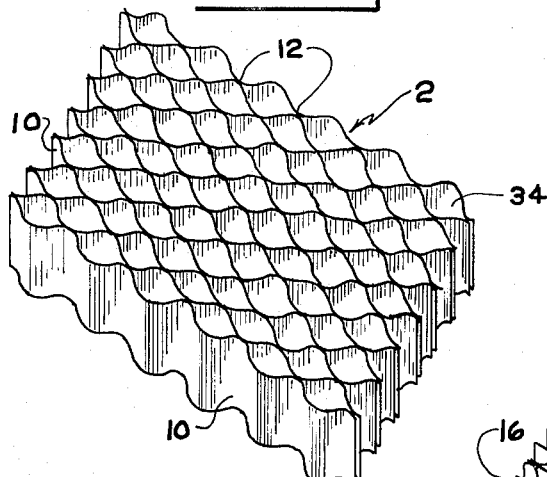
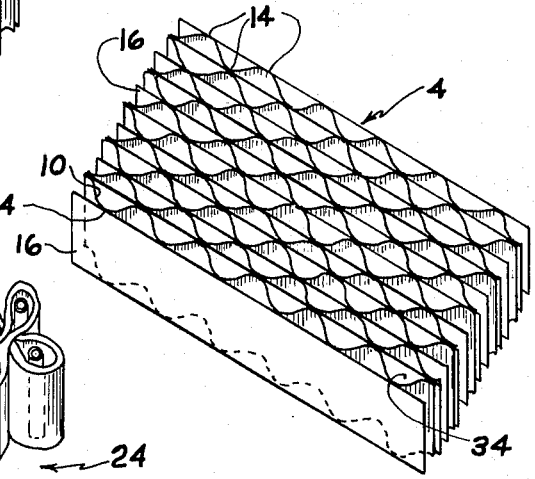
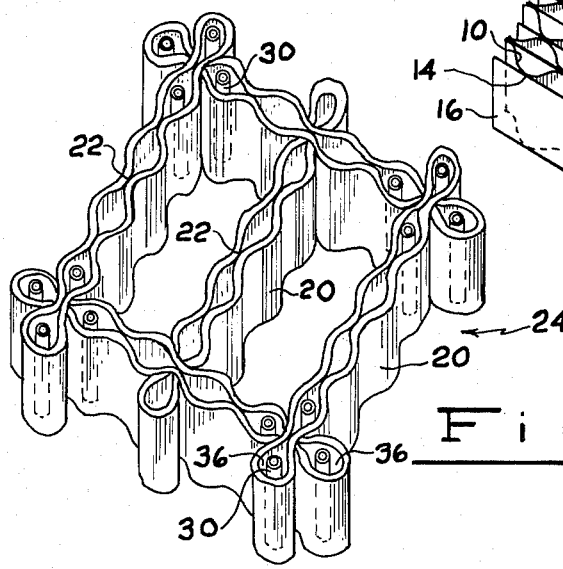
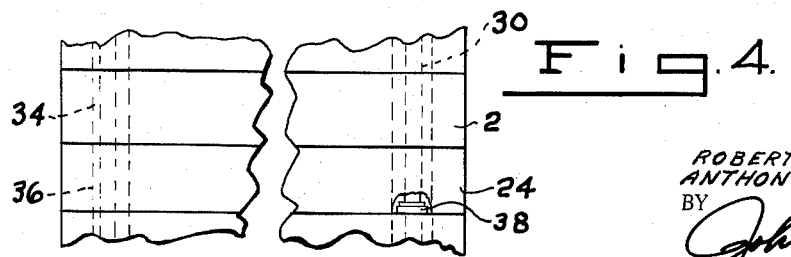
INVENTORS
ROBERT G. QUINN,
ANTHONY E. FRANZOSO
BY John A. McKinney
ATTORNEY

United States Patent Office 3,232,865
Patented Feb. 1, 1966

This invention relates to a fabricated material designed to provide particular structure and surface area in a vessel wherein organic materials are being digested by biological and/or chemical action. This invention also relates to the novel method of making the components of the system and to the method of making the system itself.

Water is clearly recognized as an invaluable natural resource. Consequently, the discharge of industrial waste in relation to water supply and water use is a problem which varies in specific areas depending upon the distribution and type of industry. In general, the more densely the area is populated, the greater the problem of industrial waste treatment and disposal. For example, in industrial states such as New Jersey, with some 2,000 industries producing liquid wastes, the waste volume is equal to that of the entire sewered population of the state.

In controlling industrial waste, treatment may be based upon various processes such as, separation of solids from the liquid, oxidation of organic and oxygen demanding materials, neutralization, removal of poisonous substances, and disposal of residues.

The methods used are physical, chemical and biological in nature or may constitute combinations of various methods. One of the most prominent treatments and one which has provided a great deal of interest recently is that of oxidation, which is accomplished by biological methods.

For example, removal of poisonous substances requires specific methods of treatment, depending upon the type and amount of poisonous material present. Certain wastes containing organic poisons, antiseptics and similar materials are amenable to biological treatment. Solvents, in general, can be treated in low concentrations biologically with other wastes, but many of the solvents have a high oxygen demand.

Additionally, pollution by sewage contributes organic and inorganic materials and large number of bacteria, all of which have an objectionable effect on the quality of the water in the stream and its usage for domestic and industrial purposes. These organic matters are generally present in coarse or fine suspension or in solution and are composed primarily of carbohydrates, fats and proteins. In addition to the sanitary problems created, these materials may also spread on the surface of the water, forming unsightly sleek.

The discharge of sewage and wastes sets in motion a complex chain of physical, chemical, biological and biochemical events, which may act collectively as self-purifiers. A most important aspect of this self-purification of water sources is the result of bacterial action upon the pollution material.

The biochemical oxygen demand (BOD) of a water source is therefore a very important feature in considering purification and waste treatment. The BOD is the amount of dissolved oxygen used in bacterial decomposition of water, the higher the BOD, the harder the cleaning job.

Many advances have been made during the past decade in creating a better understanding of the mechanism of biological oxidation of organic wastes. Such new concepts have been applied to the design of biological oxidation systems for solving industrial wastes treatment problems.

The design of a biological oxidation system requires knowledge of several process variables and their interrelationship to operating parameters. These include BOD removal characteristics for specified operating conditions, oxygen requirements for various loading levels, sludge production, nutritional requirements, oxygen transfer, and solid-liquid separation.

For many years pulp and paper makers have used conventional trickling filters with slag or rocks as media. These filters act as artificial feeding grounds for bacteria in wastes, thus keeping biochemical oxygen demand down. But such filters are not very efficient.

Generally, the effluent which was produced had a poor appearance due to masses of microorganisms dispersed in the waste despite secondary settling, and the final color was much darker than the influent. In order that the process work, great predilution was necessary, large stone was required, thereby reducing surface area per unit volume of stone, forced ventilation was required, and nutrients in the form of ammonia and phosphates had to be added. In addition, effective operation necessitated preheating in cold weather.

More recently, companies began working with plastic materials such as, polystyrene and polyvinyl chloride, for use as media. In these systems effluent from a mill is pumped up a pipe through the center of a multi-grid structure and spread over the medium by a rotary distributor. As the waste flows down through the grid, bacteria grow on the sides of the plastic. To speed their growth, anhydrous ammonia and phosphoric acid were added to the effluent from the mill. These compounds supply nitrogen and phosphorus for the bacteria's diet. However, most of these systems, while satisfactory, nevertheless, have several deficiencies such as the need for additional chemicals and the extended periods of time to clean and prepare for effective use and cost.

It has now been discovered that an even more efficient system may be provided which consists of a grid such as a honeycomb-like structure made of asbestos paper that has been treated with a metallic phosphate. The phosphate treatment serves to stiffen the asbestos paper, improve its wet strength and resistance to erosion, and as a most significant feature, the phospho-asbestos itself accelerates the growth of digesting organisms. In a standard trickling filter operation, a period of several days is necessary to develop a biological digesting film on the surface of the stone. The phospho-asbestos filled tower becomes effective in six to eight hours.

OBJECTS

It was therefore an object of this invention to provide a new material to be used in trickle filter system to improve upon the previous systems by overcoming the disadvantages mentioned above.

It was a further object to provide a new trickle filter system utilizing new materials to effectively treat waste water.

Another object of this invention was the provision of a method for preparing the components of the system and the system itself.

The invention, as to method of operation, structure to accomplish the operation and method of formation, together with further objects and advantages thereof will best be understood by reference to the following detailed description and claim taken in conjunction with the accompanying drawings wherein:

FIG. 1 is a perspective view illustrating a honeycomb filter structure made in accordance with the instant invention;

FIG. 2 is another perspective view, this illustrating a second type of filter structure, a corrugated structure;

FIG. 3 is a perspective view of a tower support structure; and

FIG. 4 is a fragmentary sectional of a tower employing the filter unit and support structure.

BRIEF DESCRIPTION OF THE INVENTION

The invention consists of a honeycomb or similar structure made with asbestos paper that has been treated with a phosphate such as aluminum phosphate. The paper is preferably that which contains a calcium silicate binder. It has been discovered that when such a system is used to treat waste water, the phospho-asbestos acts to accelerate the growth of digesting organisms without the addition of other chemicals. The aluminum phospate treatment serves to stiffen the asbestos paper and to improve its wet strength and resistance to erosion. In a standard trickling filter operation, a period of several days is necessary to develop a biological digesting film on the surface of the stone. The phospho-asbestos filled tower becomes effective in six to eight hours.

The objective is to provide a high surface structure of material with rigidity and sufficient wet strength to provide necessary structural strength. The material also must be highly resistant to erosion and have little or no solubility in tower fluids. It has been discovered that an asbestos paper bonded with calcium silicate and subsequently treated with aluminum phosphate makes an outstanding material and in addition, it in noncombustible. This material is formed into corrugated sheets which are adhered together at the nodes with a suitable adhesive such as an epoxy resin adhesive.

Referring now to the drawings and particularly to FIGS. 1 and 2, respectively, it is seen that the asbestos paper structure may have, among others, an open honeycomb design 2 or a split honeycomb design 4. Corrugated phosphate-treated asbestos papers 10 are adhered by an adhesive, such as epoxy resin, at adjacent nodes 12 in the open honeycomb structure and to portions 14 of intermediate flat phosphate-asbestos sheets 16 in the split honeycomb structure.

When the units are employed in multiples in tower installations, it is advantageous to employ support structures intermediate a given number of units. Such a support unit is illustrated in FIG. 3 wherein two-ply corrugated phosphate-treated asbestos sheets 20 are adhered at adjacent nodes 22 to form an egg crate-like structure 24.

FIG. 4 shows a regular unit 2 or 4 adjacent a support structure 24 in a tower 26. Tube 30 made of the same material fits through corner cells 34 and 36 of the unit and support structures, respectively, and are provided with collars 38 to position the support structure.

GENERAL DESCRIPTION OF THE INVENTION

A more complete understanding of the invention may be obtained by reference to the following examples of operations within the scope of this invention. In these examples all parts and percentages are by weight unless otherwise indicated.

Example I

Asbestos paper with high wet strength bonded with calcium silicate formed during the steam curing of the paper was treated with aluminum phosphate solution so that the uptake was about 25% of sheet weight on a dry basis. While the sheet was wet, it was corrugated and dried while corrugations were held in place. The corrugator was a pair of parallel bars on link chains. Dried sheets were then passed through a coating section where nodes of flutes were coated with an epoxy adhesive. The wet sheet was conveyed to a stacker that indexed the sheets so that adhesive coated nodes came in contact, thus providing a honeycomb structure. The assembled sheets were oven dried and then cut to desired dimensions. It is important that the adhesive employed have sufficient initial tack to hold the stacked sheets together when the pile is green and be highly inert and waterproof. It has been found that an epoxy resin is effective, making a bond stronger than the phospho-asbestos sheet itself.

Example II

The split design structure was made in the same way except that flat sheets of phospho-asbestos were fed alternately with the above-described corrugated sheets to the stacker. Corrugations were ¾ in. high and approximately 1½ in. long.

Example III

Waste water influent was distributed over the top of a tank containing a number of sections of phospho-asbestos fill. The waste water trickled down the tower while air was blown counter-currently upward. The biological oxygen demand of the water was progressively reduced so that the effluent from the tank may be returned to the stream. The number of sections in a tank, tank size and number of tanks in series may be varied depending upon degree of treatment or BOD reduction required.

In a test tower at a sewage plant, the range of BOD in parts per million of the input was 91 to 400 and the output, 37 to 155 p.p.m., respectively. There was 61.3% reduction in BOD at heaviest loading and 86% reduction at lightest loading. Flow rate to tower was ten times greater than applied to large trickling filter per unit area. The towers were two in series, the first was a honeycomb structure and the second was a corrugated structure. Corrugated structure fill weighed 3.6 lb./cu. ft. while honeycomb weighed 1.9 lb./cu. ft. A honeycomb section weighed 9 lb. 14 oz. and when wet with growth, weighed 42 lb. 2 oz. The structure was sufficiently strong to withstand this loading without buckling.

Example IV

In tower construction it is ofttimes advantageous and necessary to introduce supporting sections under a honeycomb structure to improve the structural strength of the tower assembly. It has been found that a supporting section may be advantageously constructed of two ply phospho-treated-asbestos sheets. These sheets are piled together with a continuous coating of resin, such as epoxy. The sheets previously had been corrugated. A honeycomb was made of two sheets by adhering the nodes. The resulting strip material was then assembled into an egg crate-like structure.

This structure may be tied together and supported by tubes which are positioned within the honeycomb. The tubes have collars to support the honeycomb.

The tubes may be formed from the same material, phospho-asbestos or may be a synthetic plastic material such as phenolic. The tubes may be the supporting means for the structure or the tubes may be strapped to the wall of the tank or tower.

The honeycomb was approximately 1 in. by 1½ in., the supporting tubing ¾ in. in diameter, and the collars large enough to cover one cell. It is also possible to employ multiple lengths of honeycomb section by employing the strapping at the wall to connect to additional tube units on the next set. The tubes may be threaded for several connections within the tower so that individual sections may be removed without dismantling the whole assembly.

The asbestos products which are adaptable to the instant invention are asbestos sheet materials that are usually made by water laying and are generally referred to as asbestos paper or mill board. The asbestos fibers which are most commonly used for the manufacture of asbestos paper range from the Group 5 to the Group 7 according to the Quebec Producers Association Classification. These papers generally contain a binder material in amounts between 2 and 10% or higher, and it is preferred that the binder be inorganic so as not to be affected by the biochemical reactions in trickle filter uses. Such a binder is preferably calcium silicate formed from lime and silicia during the steam curing of the asbestos paper. However, other inorganic binders, such as sodium silicate, etc., may be used as well as organic binders if they will not, consequently, affect the process in which the filter is used.

The asbestos paper may be made in any of the conventional papermaking processes and in the ordinary case, according to this invention, the usual asbestos fiber of commerce may be used, namely, chrysotile asbestos fiber. According to this invention and as used in the claim, the term asbestos is intended to include, in addition to chrysotile asbestos, other commercial varieties of asbestos, namely anthophyllite, actinolite, tremolite, crocidolite, amosite, various amphibole fibers and Canadian picrolite.

It is possible to include in the asbestos paper other mineral fibers, such as rock wool, slag wool, glass fibers and the like, which are heat-resistant, but such fibers have the disadvantage of being more brittle and frangible than asbestos fibers. As a general rule, the product produced according to this invention should consist in major proportion by weight of asbestiform mineral fibers.

In producing the phosphate-asbestos product, the asbestos sheet material is first treated with a silicate and thereafter passed through an impregnation step whereby about 1 to 40% take up of phosphate on a dry basis may be effected.

In addition to aluminum phosphate, other water-soluble inorganic phosphates are effective in the practice of this invention. Those water-soluble inorganic phosphates which provide a product having high resistance to water and which are preferably employed in the practice of this invention, may be selected from the group consisting of phosphoric acid, sodium acid pyrophosphate, potassium acid pyrophosphate, sodium pyrophosphate, sodium phosphate (monobasic), sodium phosphate (tribasic), ammonium phosphate (monobasic), ammonium phosphate (dibasic), ammonium phosphate (tribasic), potassium phosphate (monobasic), barium orthomonophosphate, magnesium hydrogen phosphate, chromium phosphate, aluminum acid phosphate, and magnesium biphosphate, among others.

In addition to the fiber and bonding components of the products produced according to this invention, the product may include a minor quantity of a finely-divided filler material. For example, a small quantity, e.g., of the order of 5% to 10% of the weight of the fiber, of a material such as diatomaceous earth, may be employed. A filler such as diatomaceous earth does not have an adverse effect on the properties of the material. Another filler which affords considerable porosity is fine pumice. Moreover, other fillers such as clay, talc, pigments to impart suitable color, etc., may be employed.

While described herein as having particular use in a trickle filter system, the filter unit is likewise adaptable to other uses such as in aerating towers and the like.

It is believed the above provides a complete description of the invention in such manner as to distinguish it from other inventions and from what is old, and provides a description of the best mode contemplated of carrying out the invention and thereby complies with the patent statutes.

It is to be understood that variations and modifications of the invention, as illustrated by specific examples herein, may be made without departing from the spirit of the invention. It is also to be understood that the scope of the invention is not to be interpreted as limited to the specific embodiments disclosed herein but only in accordance with the appended claim, when read in the light of the foregoing description.

What we claim is:

A method of purifying waste water comprising, passing said water in direct contact with a contact core comprising a plurality of oven dried composite sheets of asbestos paper impregnated with an initially water soluble metallic phosphate in an amount between 10 and 40% by weight of dry impregnated paper, said sheets, by reason of said phosphate impregnant, being capable of accelerating the growth of biological digesting organisms and effecting purification of said water.

References Cited by the Examiner
UNITED STATES PATENTS

| 735,335 | 8/1903 | Bird | 154—45 |
| 869,747 | 10/1907 | Starr. | |
| 2,434,466 | 1/1948 | Marc. | |
| 2,793,017 | 5/1957 | Lake | 261—112 |
| 2,986,379 | 5/1961 | Kramig | 261—112 X |
| 3,084,918 | 4/1963 | Kohl et al. | 261—112 |

MORRIS O. WOLK, *Primary Examiner.*